United States Patent [19]

Rockstead et al.

[11] 4,261,207
[45] Apr. 14, 1981

[54] FLUID PRESSURE-SENSING DEVICE

[76] Inventors: Raymond H. Rockstead, 10041 Tesla Rd.; Harry T. Kendall, 1132 Via Cristobal, both of Livermore, Calif. 94550; Frederick M. Wilson, 4851 Mauna Loa Park Dr., Fremont, Calif. 94538

[21] Appl. No.: 868,478

[22] Filed: Jan. 11, 1978

Related U.S. Application Data

[62] Division of Ser. No. 763,929, Jan. 31, 1977, abandoned.

[51] Int. Cl.² ............................................. G01L 9/02
[52] U.S. Cl. ............................................. 73/746; 338/4
[58] Field of Search ................... 73/746, 745, 726; 338/4, 6, 39

[56] References Cited

U.S. PATENT DOCUMENTS

| 2,918,641 | 12/1959 | Giovanni | 338/4 |
| 3,979,959 | 9/1976 | Veron | 73/746 |

FOREIGN PATENT DOCUMENTS 550547  4/1977  U.S.S.R. .................... 73/727

Primary Examiner—Donald O. Woodiel
Attorney, Agent, or Firm—Warren, Chickering & Grunewald

[57] ABSTRACT

A device for sensing and/or measuring fluid pressure which includes a pressure-sensing tube elongating as a function of fluid pressure therein, a non-expanding member connected to the tube and extending in generally parallel relation thereto and terminating short of a free distal end of the tube, and an electric resistance strain gage connected to and spanning the distance between the distal end of the tube and the adjacent end of the non-expanding member, the combination functioning to provide a mechanically amplified motion at the strain gage with excellent lineal signal to pressure response.

5 Claims, 5 Drawing Figures

FLUID PRESSURE-SENSING DEVICE

This application is a division of Application Ser. No. 763,929, filed Jan. 31, 1977, now abandoned.

BACKGROUND OF THE INVENTION

1. Field of Invention

The invention relates to instruments for measuring or sensing fluid pressure and, more particularly, to structures which accomplish such sensing by the expansion of a member under the fluid pressure being sensed. Reference is made to Rockstead et al. U.S. Pat. No. 3,844,173.

2. Description of Prior Art and Summary of Invention

Heretofore, it has been proposed to mount an electromechanical sensing device, such as a strain gage or the like, on the surface of a diaphragm mounted across a pressure vessel in order to sense the deflection of the diaphragm as a function of fluid pressure in the vessel. In such instance, the amount of movement sensed by the strain gage is necessarily small and, as a result, the signal-to-noise ratio is poor. Also, the relationship between displacement at the strain gage and the fluid pressure being monitored is non-linear, thus requiring the use of relatively complicated electric circuits and components to obtain reasonable accuracy and correction for the non-linearity. One of the principal features of the present invention is that the structure provides a motion multiplication configuration whereby the displacement at the strain gage per unit of length of the strain gage is much greater than the displacement at any point on the surface of the member being stressed, thus dramatically increasing the signal-to-noise ratio; and of equal importance, the structure provides a substantially perfect linearity between the signal and the pressure being monitored.

Another object of the present invention is to provide a fluid pressure-sensing device of the character described which provides excellent sensitivity with minimum required displacement, thus enabling the device to function in the lower region of the stress/yield curve where the lineal relation of Hooke's Law applies, and to accomplish the foregoing without the use of complex, expensive signal-amplifying and correcting circuits.

A further object of the present invention is to provide a fluid pressure-sensing device of the character above which is of simple, straightforward construction using common, relatively available materials in a compact configuration which will provide safe, dependable, accurate and repeatable operation over an indefinitely long period of use.

Still another object of the present invention is to provide a fluid pressure-sensing device of the character described which is well adapted for miniaturization in which all of the parts may be constructed in compact form and rugged materials affording large overload capacity without permanent deformation.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

DETAILED DESCRIPTION OF THE INVENTION

Figure 1:
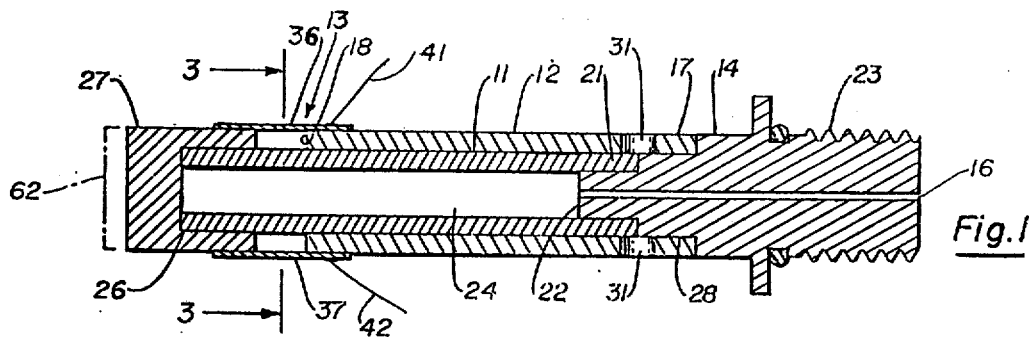
FIG. 1 is a cross-sectional view of a fluid pressure-sensing device constructed in accordance with the present invention.

The fluid pressure-sensing device of the present invention comprises, briefly, a support 14; an elongate hollow member 11 defining an elongated fluid pressure chamber 24, elongating as a function of fluid pressure therein, member 11 having one end 21 secured to support 14 with the balance of the member extending in unsupported relation thereto for relative longitudinal displacement of the opposite end 26 of member 11 with respect to the support as a function of pressure in the chamber, support 14 having a passage way 16 communicating with chamber 24 and adapted for connection to a source of fluid pressure to be sensed; a second substantially non-expanding member 12 connected to support 14 and extending therefrom longitudinally of member 11; and means 13 sensing relative movement between member 11 and the adjacent opposite end 18 of member 11. Pressure-sensing member 11 may comprise a simple cylindrical metal tube having one end 21 secured and sealed to support member 14 in registration with passageway 16 and with its opposite end 26 closed so that the internal chamber 24 in tube 11 will be pressurized at the pressure being monitored and the corresponding elongation of the tube may be measured. The elongation of a tube is a near perfect analog of the applied internal pressure within the tube and this relationship holds over the entire length of the tube. Accordingly, a substantially linear signal to pressure response is obtained.

As another feature of the present device, nonexpanding member 12 here has one end 17 secured to support 14 and is positioned to extend longitudinally of tube 11 to locate its outer end 18 adjacent the distal end 26 of tube 11. Accordingly, a measurement of displacement between ends 18 and 26 will represent the accumulated elongation of tube 11, and thus provide a significant mechanical amplification of the per unit length elongation of the tube. This high gain multiplier enables the device, more specifically tube 11, to operate in the lower region of the stress/yield curve of the material used, thus assuring the displacement to always be within the lineal response according to Hooke's Law and, at the same time, affording a device which has inherent high overload capacity. The use of an electric resistance strain gage in combination with the motion-amplifying means affords high sensitivity, reading accurately down to a few millionths of an inch deformation. Accordingly, the present design requires only a relatively short length of tube, typically in the range of ½ inch in length and ⅛ to ¼ inch diameter, which, in turn, enables compact miniaturization of the unit. At the same time, the amplified lineal displacement affords a high signal-to-noise ratio, simplifying the electric readout circuit and avoiding the need for complex and expensive signal-amplifying and correction circuits.

Various materials may be used for tube 11 and support member 14, which are in contact with the pressure fluid. Where applicable, stainless steel is suggested. Many fluid pressure applications will operate in the lower one-quarter portion of the yield curve of the material, thus affording both linearity of response and very high safety margins from a stress standpoint. Preferably, members 11, 12 and 14 are formed of the same material in order to avoid differential temperature expansion.

Electric strain gages are commercially available from B.L.H. of Lima, Ohio and Micro-Measurements of Romulus, Michigan. These gages are available in various sizes and with various electrical characteristics, enabling a ready selection for individual sizes and types of strain-sensing structures. These gages characteristically provide a dependable, accurate signal with very high speed response time.

To facilitate the connection of the present device to a source of fluid pressure to be measured, support member 14 is here formed with a threaded fluid coupling portion 23 which may be threaded into a conduit or wall of a vessel containing the fluid pressure to be monitored. Portion 23 is here formed as a threaded nipple extension on an end of member 14 opposite to the point of attachment of members 11 and 17, passageway 16 extending axially through the length of member 14.

Most conveniently, member 14, tube 11 and member 12 may be formed as a compact, concentric assembly. Tube 11 may be formed integrally with support member 14 by appropriate machining or, as here shown, tube end 21 may be mounted on and sealed to a cylindrical end 22 on support member 14 and is closed at its opposite end 26 with a cap closure member 27, sealing off the tube and subjecting the tube interior 24 to the fluid pressure being monitored and as admitted through passage 16. Preferably, member 12 is also of tubular form and has one end 17 thereof telescopically mounted upon and secured to an enlarged annular shoulder 28 on support 14 concentric to end 22, thus disposing member 12 in concentric surrounding relation to tube 11. One or more inspection openings 31 are desirably formed in outer tube for visual inspection of the integrity of the connection of pressure tube 11 to the support member, or for checking the solder or other bonding agent between members 12 and 14.

Cap closure member 27 is here of cylindrical form, secured and sealed onto the outer end 26 of tube 11 and presents an exterior surface substantially longitudinally aligned with the exterior surface of member 12 for most convenient mounting of the bridging strain gage 13.

Figure 5:
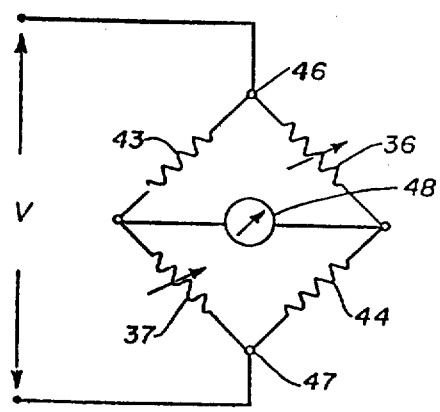
FIG. 5 is an electrical circuit diagram used with the present device.

Preferably, and as here shown, gage 13 comprises a pair of electric resistive elements which may be conveniently mounted on diametrically opposite sides of non-expanding tube 12 and closure 27; and an electric bridge circuit, illustrated in FIG. 5, is adapted for connection to resistive elements 36 and 37 to provide an electric signal as at galvanometer 48, which will be a function of the elongation of member 11. Typically, elements 36 and 37 are photo-formed grids encapsulated in a plastic sheet providing a very thin, flexible structure which can be applied to members 12 and 27 by any of the standard strain gage adhesives. A pair of lead wires 41 and 42 may be soldered directly to copper terminals typically provided on strain gages. Other types of strain gage may be used, such as gage wires bonded on a metal foil, etc., the essential characteristic being the bonding of the expandable gage wire between the opposed ends of members 12 and 27 so as to provide a resistive change in the gage wires with a change in the gap between members 12 and 27 and across which the gage wires are mounted, as here illustrated.

A typical electric bridge sensing circuit is illustrated in FIG. 5, wherein resistive elements 36 and 37 are connected on opposite sides of the bridge and are balanced by a second pair of resistive elements 43 and 44 having the same resistance and temperature coefficient as elements 36 and 37. Elements 43 and 44 may be embodied in identical strain gages, identical to strain gages 13, and which are mounted directly upon the outer non-expanding member 12 so that all of the resistive elements in the bridge will have a common thermal expansion. A voltage applied to bridge terminals 46 and 47 will produce an electric signal output at galvanometer 48 with variations in resistance of elements 36 and 37 produced by elongation of member 11.

Figure 2:
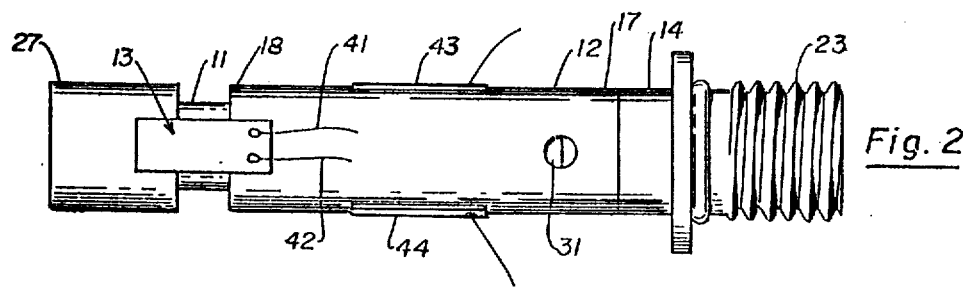
FIG. 2 is a side elevation of the device.
Figure 4:
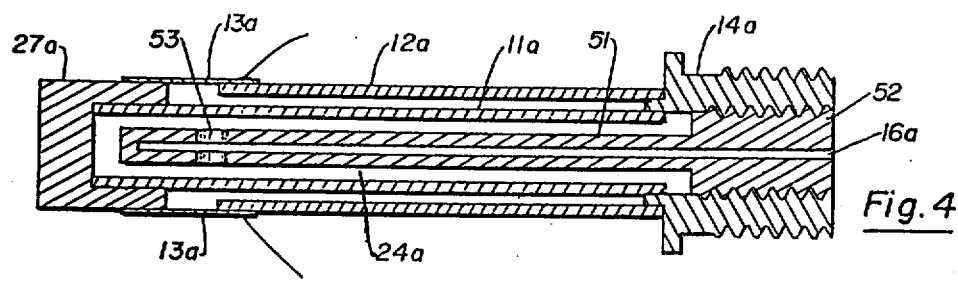
FIG. 4 is a cross-sectional view of a modified form of the device.
Figure 3:
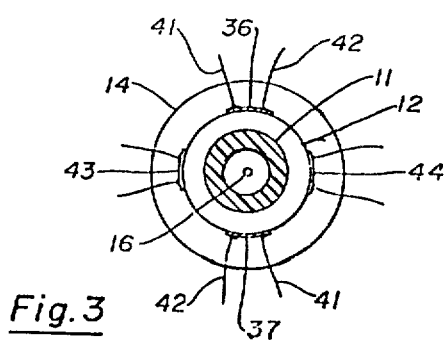
FIG. 3 is a cross-sectional view taken substantially on the plane of line 3—3 of FIG. 1.

A modified form of the invention is illustrated in FIG. 4, wherein the structure is particularly adapted for use in sensing fluid pressure of fluids having a high or low temperature compared to the atmosphere or environment in which the sensing device is mounted. As illustrated in FIG. 4, there is mounted within the interior of strain-sensing member 11a a heat-content-reducing member 51 which has one end 52 connected to support 14a for reducing differential temperatures of the fluid being conducted into the sensing tube 11a and the surrounding reference or non-expanding member 12a; and importantly, the interior member 51 displaces, and reduces the volume of, fluid and, consequently, the heat content available for producing differential thermal expansion. As here shown, passage 16a is provided centrally through member 51 and is ported at 53 to the interior 24a of sensing tube 11a. Member 51 will preferably have the same heat-conducting properties as the balance of the structure and is formed with sufficient mass to provide rapid reduction in temperature differentials between the fluid being monitored and the various parts of the strain-sensing structure. Thus, aberrations in the signal output due to thermal expansion of the parts is minimized. In this structure, as in the structure illustrated in FIGS. 1-3, a pair of strain gages 13a is secured across the gap between the distal end of member 12a and closure 27a, and a second pair of similar strain gages containing similar resistive elements is mounted on the exterior of the reference non-expanding member 12a to provide a temperature-compensated bridge circuit, as depicted in FIG. 5.

What is claimed is:

1. A fluid pressure-sensing device comprising:
   a support;
   a first elongate hollow member comprising a cylindrical metal tube defining an elongated fluid pressure chamber elongating as a function of fluid pressure therein, said member having one end secured to said support with the balance of the member extending in unsupported relation thereto for relative longitudinal displacement of the opposite end of said member with respect to said support as a function of pressure in said chamber, said support having a passageway communicating with said chamber and adapted for connection to a source of fluid pressure to be sensed;
   a second substantially non-expanding member comprising a cylindrical metal tube of the same material as said first member connected to said support and extending therefrom insubstantially concentric centering relation to said first member and having an outer end terminating short of said opposite end of said first member; and means sensing relative movement between said second member and said opposite end of said first member comprising an electric resistance strain gage connected to and spanning the distance between said opposite end of said first member and said outer end of said second member.

2. The device of claim 1, a cylindrical cap closure for said opposite end of said first member having an exterior surface substantially longitudinally aligned with the exterior surface of said second member; and said gage comprising a pair of electric resistive elements mounted on diametrically opposite sides of said members.

3. The device of claim 1, said support having concentric cylindrical shoulders mounted internally and supporting the proximal ends of said members and having a fluid coupling portion containing said passageway and adapted for external fluid pressure connection.

4. The device of claim 3, said second member being formed with an opening for visual inspection of the mounting of said first member to said support.

5. The device of claim 1, and a heat-content-reducing member connected to said support and in heat-conducting relation to said second member and extending into and longitudinally of said chamber for reducing differential temperatures of the fluid within said chamber and said second member.

* * * * *